(12) United States Patent
Weston

(10) Patent No.: US 7,872,689 B2
(45) Date of Patent: Jan. 18, 2011

(54) SYSTEM AND METHOD FOR IMPROVED COMPOSITE DECODING

(75) Inventor: Martin Weston, Petersfield (GB)

(73) Assignee: Snell Limited, Hampshire (GB)

( * ) Notice: Subject to any disclaimer, the term of this patent is extended or adjusted under 35 U.S.C. 154(b) by 1355 days.

(21) Appl. No.: 10/539,724

(22) PCT Filed: Dec. 22, 2003

(86) PCT No.: PCT/GB03/05690

§ 371 (c)(1),
(2), (4) Date: Mar. 2, 2006

(87) PCT Pub. No.: WO2004/057877

PCT Pub. Date: Jul. 8, 2004

(65) Prior Publication Data

US 2006/0152632 A1     Jul. 13, 2006

(30) Foreign Application Priority Data

Dec. 20, 2002   (GB)   ................................. 0229829.7

(51) Int. Cl.
*H04N 9/78*   (2006.01)

(52) U.S. Cl. ........................ 348/663; 348/638; 348/665; 348/507

(58) Field of Classification Search ................ 348/663, 348/638–639, 725–727, 420.1, 437.1, 438.1, 348/507–508, 664–670, 640–641, 491
See application file for complete search history.

(56) References Cited

U.S. PATENT DOCUMENTS 5,107,341 A * 4/1992 Sendelweck et al. ........ 348/584
5,298,982 A * 3/1994 Lagoni ........................ 348/713
5,621,477 A * 4/1997 Demmer ..................... 348/639

FOREIGN PATENT DOCUMENTS

| EP | 0394004 | 4/1990 |
|---|---|---|
| EP | 0588190 | 9/1993 |
| EP | 1175102 | 1/2002 |
| GB | 2 300 538 | 11/1996 |
| JP | 11-505687 | 5/1999 |
| JP | 03-183293 | 7/2003 |
| JP | 08-098202 | 4/2008 |
| WO | WO 0237420 | 5/2002 |

OTHER PUBLICATIONS

Japanese Office Action for Japanese Application No. JP 2004-561690 mailed on Apr. 7, 2009.
PCT International Search Report International Application No. GB/03/05690 International Filing Date: Dec. 22, 2003.
Patents Act 1977:Further Search Report under Section 17 Application No. GB 0229829 7 Date of Search: Nov 11, 2003.

* cited by examiner

*Primary Examiner*—Trang U Tran
(74) *Attorney, Agent, or Firm*—Pearl Cohen Zedek Latzer, LLP

(57) ABSTRACT

A method of composite decoding in which the input signal is converted into the frequency domain, and the symmetry of frequency components with respect to the subcarrier frequency is compared. The comparison is varied in dependence upon the frequency being processed. In this way, the separation can be adapted to suit known characteristics of different portions on the input spectrum. This is particularly useful for processing NTSC signals. The allocation of a particular component to chrominance may be biased in dependence upon a measure of the luminance information of the composite signal at a corresponding spatial frequency.

12 Claims, 13 Drawing Sheets

SYSTEM AND METHOD FOR IMPROVED COMPOSITE DECODING

PRIOR APPLICATION DATA

The present application is a national phase application of International Application PCT/GB03/005690, entitled "Improved Composite Decoding" filed on Dec. 22, 2003, which in turn claims priority from United Kingdom application 0229829.7, filed on Dec. 20, 2002, both of which are incorporated by reference in their entirety.

FIELD OF THE INVENTION

This invention concerns the decoding of composite colour television signals to colour components.

BACKGROUND OF THE INVENTION

Composite colour television systems, such as NTSC and PAL are designed so that the luminance and chrominance components of the signal can occupy the same spectrum and yet be separated with acceptable levels of crosstalk. Use of the composite signal for display always requires it to be separated (decoded) into primary colour components (red, green and blue); many other processing operations require at least the separation of the chrominance from the luminance, and often, further decoding of the chrominance.

The choice of decoding method for a particular application depends on the acceptable level of crosstalk between chrominance and luminance, and the degree of distortion to the wanted chrominance and luminance as a result of the separation process. Where images are to be displayed on large screens, or must stand comparison with images derived from film, the very highest level of chrominance and luminance separation is necessary, with negligible crosstalk and distortion.

High quality composite decoders exploit the fact that the chrominance is modulated onto a high-spatial-frequency, moving diagonal carrier, which is unlikely to be replicated by real luminance. By using contributions from several lines and fields it is possible to create comb-filters which allocate different parts of the signal spectrum to luminance and chrominance and so achieve separation with little crosstalk on typical pictures. However, it is frequently necessary to "adapt" the frequency characteristics of the filters in dependence upon the type of picture material, so as to avoid crosstalk or distortion of critical material.

European patent EP1175102 presents a novel method of doing this by using a fast Fourier transform (FFT) to convert the signal into the frequency domain and then investigating the symmetry of the spectrum with respect to subcarrier frequency. Because the chrominance components are amplitude modulated, each Fourier component of the baseband chrominance results in a pair of equal-amplitude sidebands symmetrically disposed about the subcarrier frequency. By comparing each frequency component with the corresponding component which would correspond to the opposite chrominance sideband, it is possible to determine whether the particular component represents luminance or chrominance.

The cited patent does not explain how to apply the technique to NTSC, and is restricted to applications where the signal is sampled at a multiple of the subcarrier frequency.

SUMMARY OF THE INVENTION

The present inventor has appreciated that there are a number of improvements which widen the applicability of the prior art, in particular it may be applied to the decoding of NTSC, certain distortions which may exist in the coded signal may be corrected and the processing may be carried out on demodulated chrominance signals at any sampling rate.

The invention consists in one aspect of a method of separating the chrominance and luminance of a composite colour television signal by comparing a first frequency component of the signal with a second frequency component of the signal, the second component having a frequency difference from the colour subcarrier equal and opposite to the frequency difference of the first frequency component from the colour subcarrier, characterised in that the comparison differs in dependence upon the frequency of the first frequency component.

Suitably, the comparison differs in dependence upon the horizontal spatial frequency of the said first frequency component.

Advantageously, the comparison differs in dependence upon the vertical spatial frequency of the said first frequency component.

Additionally the comparison may differ in dependence upon the temporal frequency of the said first frequency component.

In a further embodiment the comparison may differ in dependence upon horizontal, vertical or temporal differences of a composite signal.

Advantageously the temporal differences may be derived from the output of a chrominance demodulator.

In a further aspect the invention consists of a method of separating the chrominance and luminance of a composite colour television signal by comparing a first frequency component of the signal with a second frequency component of the signal, the second component having a frequency difference from the colour subcarrier equal and opposite to the frequency difference of the first frequency component from the colour subcarrier, wherein the comparison is made between frequency components of demodulated, baseband chrominance signals.

In a yet further aspect the invention consists of a method of correcting distortion of a composite colour television signal in which an upper chrominance sideband is identified and its amplitude corrected by making it equal to the amplitude of the corresponding lower chrominance sideband.

Advantageously the corresponding lower sideband is identified in terms of its horizontal spatial, vertical spatial and temporal frequency co-ordinates.

In a still further aspect, the invention consists of a method of separating the chrominance and luminance components of a composite colour television signal, comprising decomposing an input signal into frequency components, and allocating a chrominance and luminance magnitude to components at each frequency, wherein the allocation of a particular component to chrominance is biased in dependence upon a measure of the luminance information of the composite signal at a corresponding spatial frequency.

Preferably the input signal is the composite colour television signal, however it may also be a demodulated chrominance component of the television signal.

DESCRIPTION OF THE DRAWINGS

An example of the invention will now be described with reference to the drawings in which.

DETAILED DESCRIPTION OF THE INVENTION

Figure 1:
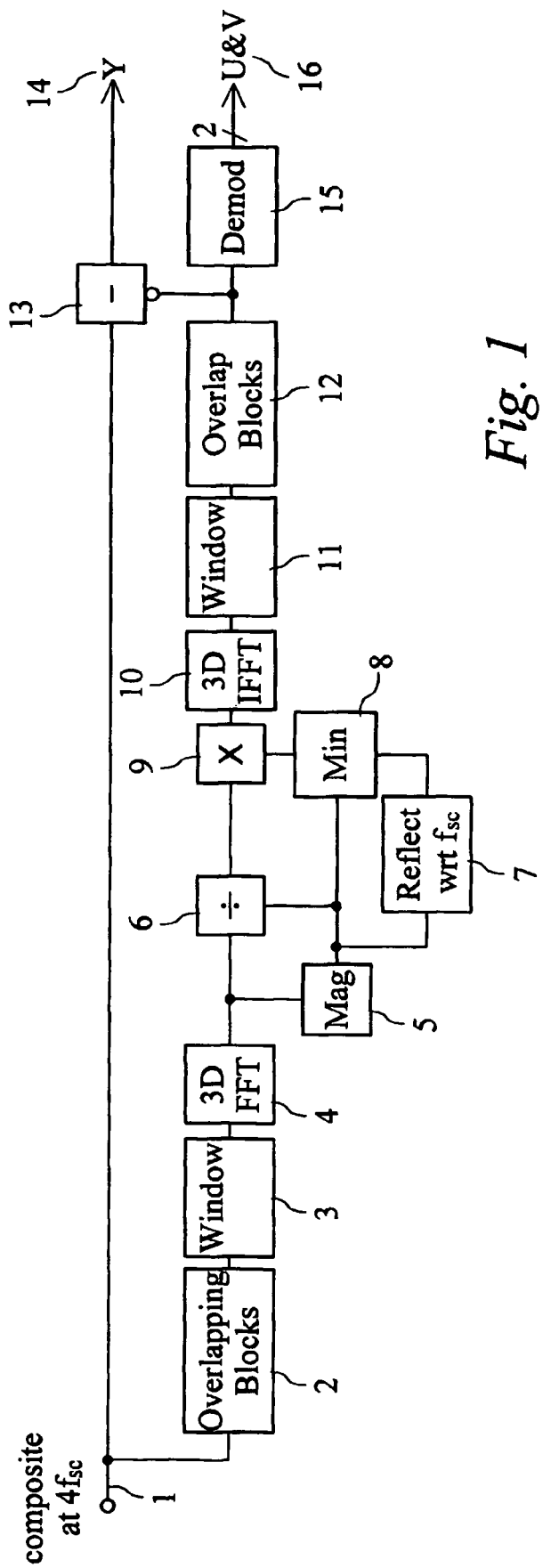
FIG. 1 shows a prior-art PAL decoder.

First a known decoder will be described to illustrate the deficiencies of the prior art. Referring to FIG. 1, a composite PAL signal (1), which has been sampled at four times its colour subcarrier frequency ($4f_{sc}$) is divided (2) into three-dimensional, spatially-overlapping blocks; a window function is applied (3) to each block; and, a three-dimensional FFT is taken (4) of each block.

A three-dimensional block means a block of spatially and temporally contiguous pixels taken from a number of consecutive fields; for example 16 horizontally-adjacent pixels on 16 vertically-adjacent lines on 8 consecutive fields, giving a total of 2048 pixels.

The result of the FFT will be (in the case of the above example) a set of 2048 frequency components defining the block of pixels in terms of horizontal spatial frequency, vertical spatial frequency and temporal frequency. Each component has both an amplitude and a phase value. These components will be processed to remove those due to luminance, so that only the components representing chrominance are input to the inverse FFT (10).

The block (5) determines the magnitude of each component. The divider (6) divides each component by its magnitude so as to normalise it to unit amplitude.

The comparator (8) compares the magnitude of each component with the magnitude of one other component. The other component is selected (by the block (7)) to be the component whose three-dimensional frequency difference from the colour subcarrier frequency is equal and opposite to the component's own frequency difference from the colour subcarrier.

Figure 2:
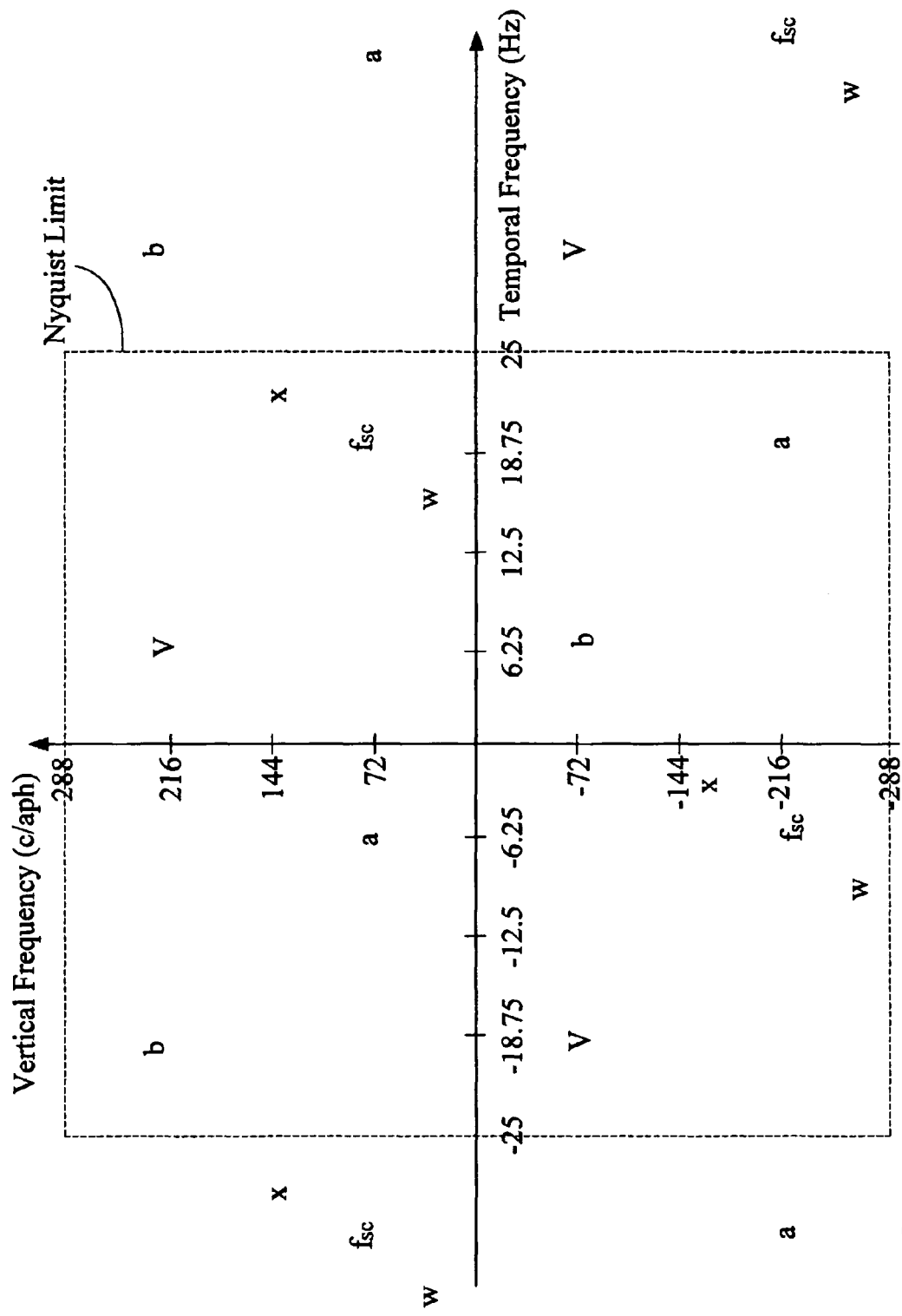
FIG. 2 shows the vertical/temporal spectrum of a PAL signal.

This point is illustrated in FIG. 2, which shows how the selection of the corresponding frequency component is made in the vertical and temporal frequency dimensions. As the signal has been sampled vertically (by the line structure) and temporally (by the field structure), the spectrum repeats vertically and temporally as shown. The figure shows the spectral position of the colour subcarrier ($f_{sc}$) and a frequency component which is to be processed (x). The position of the component with equal and opposite frequency difference is shown as (w). For completeness the figure also shows the position of the (phase alternating) V carrier (V).

FIG. 2 shows only the vertical and temporal dimensions; it must be noted that the horizontal dimension of the spectrum must treated in an analogous manner in determining the frequency component (w) which will be selected for the magnitude comparison.

Returning to FIG. 1, the block (8) outputs the magnitude of the smaller of the two compared components to the multiplier (9). As explained above the second input to the multiplier is a unity-magnitude component having the phase of the component being processed. The output of the multiplier is thus a modified frequency component having the original phase, but with reduced amplitude if the relevant "subcarrier-reflected" component had smaller amplitude.

All 2048 frequency components in each block are processed in this way and input to the inverse FFT (10), whose output is a filtered block of pixels with luminance frequencies attenuated.

The result of this processing is a three-dimensional block of 2048 chrominance pixels which is windowed in the block (11). This window is chosen so that its combination with the window (3) gives a response which tessellates; i.e. so that when the output blocks are combined (12) there is no amplitude dependency on the position within the block. An example is the use of an identical cosinusoidal function for each window, giving a raised cosine response for the combination.

The output of the block (12) is a modulated chrominance signal which can be subtracted (with appropriate allowance for processing delay) from the composite input in the block (13) to give separated luminance output (14), and demodulated (15) to give baseband U and V colour-difference outputs (16).

Inspection of FIG. 2 shows that, because of the repeating structure of the spectrum, there are certain frequencies which inherently mimic symmetrical, double sideband chrominance. One of these is the phase alternating V-axis carrier; this is fortunate as it is a true chrominance component. Another is the moving diagonal pattern at the position (a); this is identical to true subcarrier except that it moves with one third the speed in the opposite direction. A further example is shown at (b) and is identical to the V-axis carrier but moving at one third speed in the opposite direction. Both these patterns would give rise to coarse cross-colour when decoded according to the prior art.

A further disadvantage of the prior-art approach becomes apparent when both colour difference signals give rise to a sideband having the same (or very similar) frequency. In this case the magnitude of that component will depend on the relative phase of the two baseband colour difference components and the expected symmetry may not result. This is less likely in PAL because the U and V carriers have different spatio-temporal frequencies. However, in NTSC, where the two colour difference signals are modulated onto the same carrier frequency, this situation may well result from the coding of coloured patterns or textures.

An embodiment of the current invention will now be described with reference to FIG. 3. This shows a decoder having the same structure as FIG. 1, except that the minimum function (8) of FIG. 1 has been replaced by a look-up-table (308).

The table has inputs for the magnitude of the frequency component being processed, the magnitude of the corresponding component symmetrically disposed with respect to subcarrier and a third input, from the frequency-determining block (318), which defines the frequency, including in some cases all three frequency dimensions, of the component being processed.

The frequency input enables certain frequencies to be treated differently, in particular, different frequencies within the horizontal chrominance band can be treated differently in dependence upon all or any of their three dimensional frequency components. The look-up-table can have different "pages" corresponding to different frequencies or frequency ranges of the component being processed. For example, the frequencies (a) and (b) in FIG. 2 can be regarded as sources of cross-colour and their magnitudes heavily attenuated.

As well as enabling frequency-dependant behaviour, the look-up-table enables an arbitrary function of the amplitudes of the two components to be used to decide the magnitude of the component to be passed to the inverse FFT (310).

Figure 4:
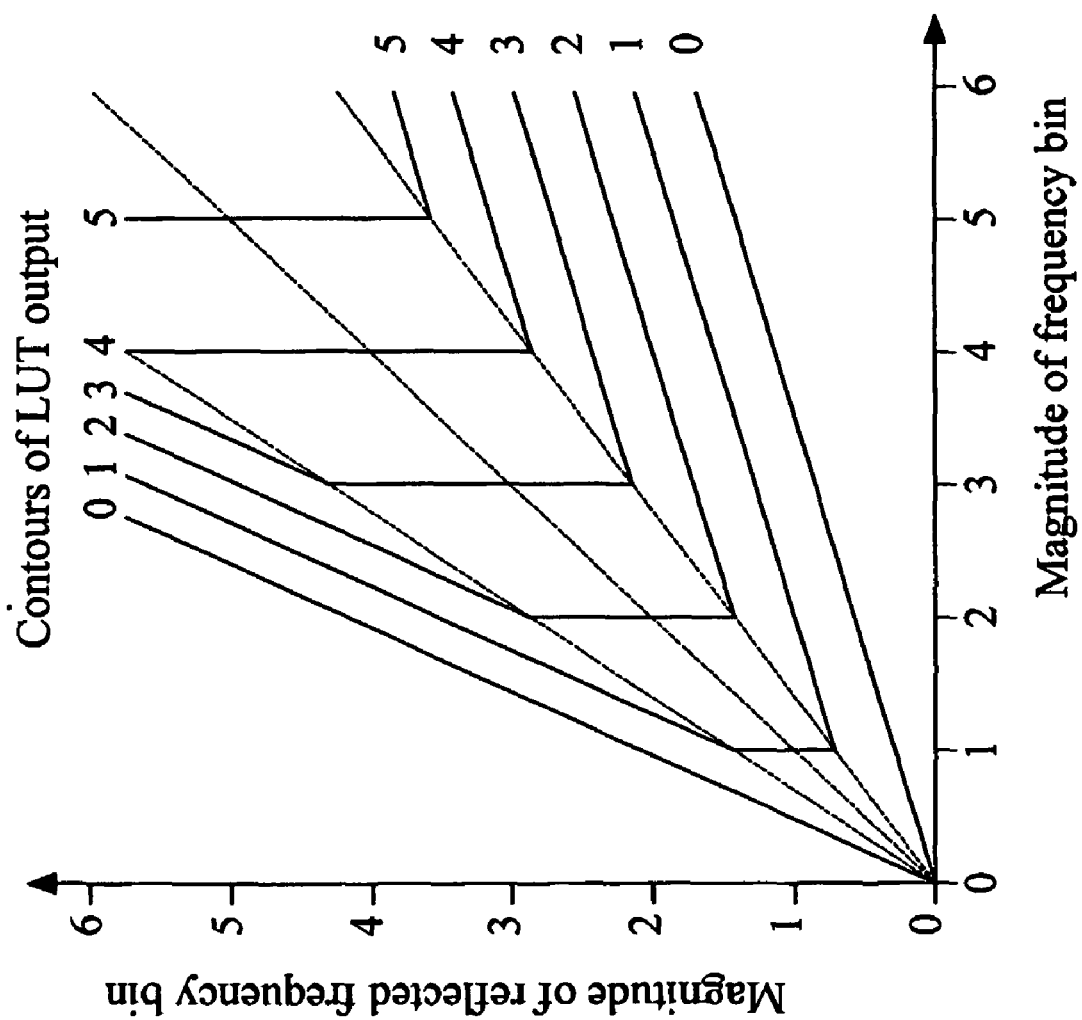
FIG. 4 shows a contour plot of a look-up-table function.

An example of a suitable function is shown in FIG. 4. This figure shows a contour plot of the table output for various magnitudes of the frequency being processed and the equivalent "subcarrier reflected" frequency component.

It can be seen that where the two components have substantially equal amplitude, the output corresponds to the amplitude of the component being processed. However, where the amplitudes are significantly different, the table output is zero. Between these two regions the output smoothly varies between these two values.

The use of a function which includes the frequency makes it feasible to decode NTSC signals; this is not considered possible in the prior art. In this case a suitable block of pixels for the FFT is 16 pixels horizontally by 16 lines vertically by 4 fields.

Figure 5:
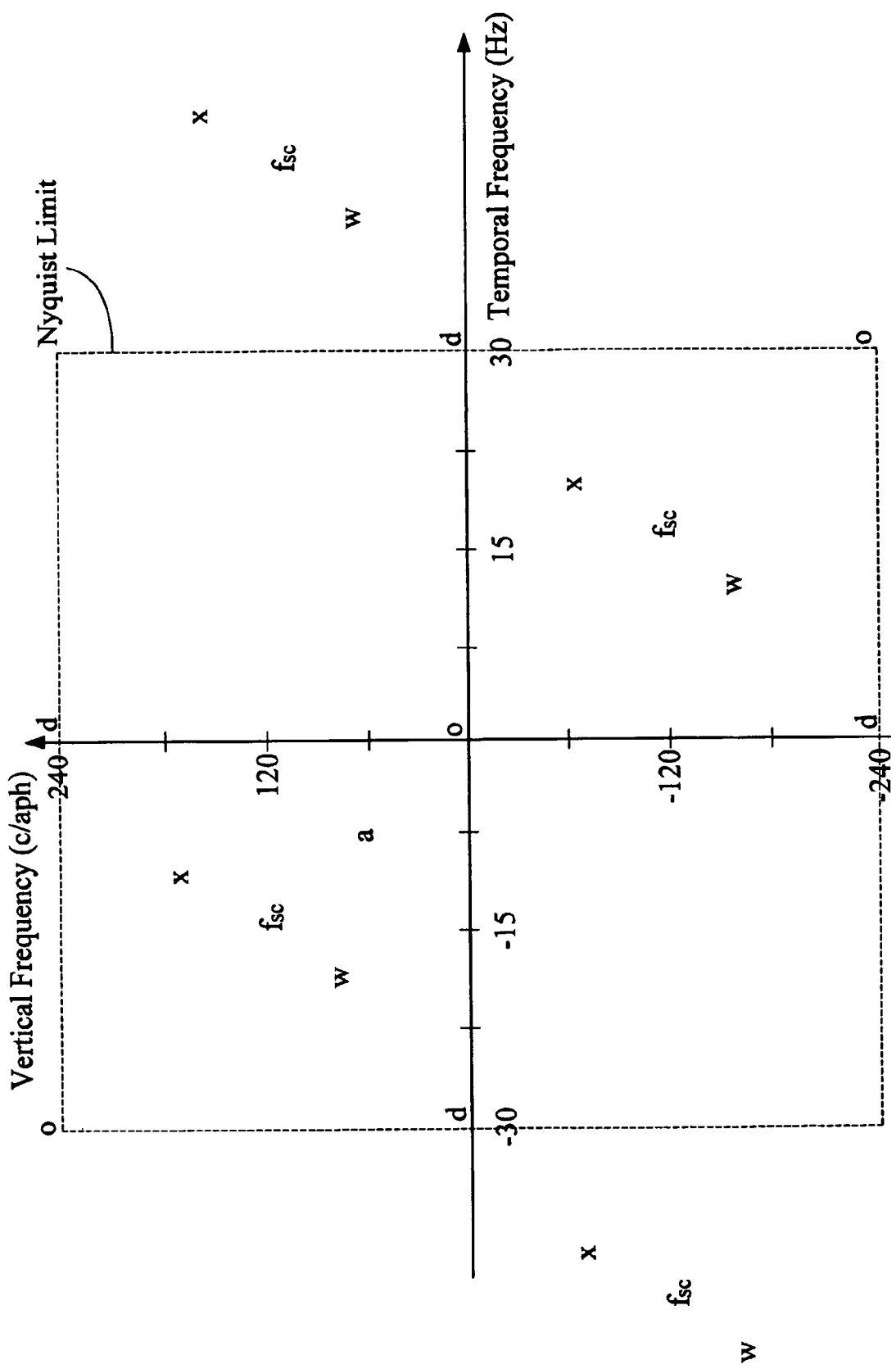
FIG. 5 shows the vertical/temporal spectrum of an NTSC signal.

FIG. 5 shows the vertical/temporal structure of NTSC chrominance. In the same way as shown in FIG. 2, the frequency (x) will occur simultaneously with the frequency (w) when (x) is due to true chrominance. However, the frequencies which (due to the spectral repeat) are inherently symmetrical about colour subcarrier are much more troublesome than in the PAL case.

Consider the frequency (o). This is at the origin of the vertical/temporal plane and corresponds to a stationary pattern of fine vertical stripes. It repeats symmetrically with respect to subcarrier and thus, in the case of naive application of the prior art, it would be a potent source of fine cross-colour.

The frequency (d) corresponds to a stationary diagonal pattern (with twice the vertical frequency of colour subcarrier) and would also be a source of cross-colour. Although most picture sources would be pre-filtered to avoid this frequency (because it would be heavily aliassed) it is undesirable for stationary detail to contribute cross-colour.

Figure 3:
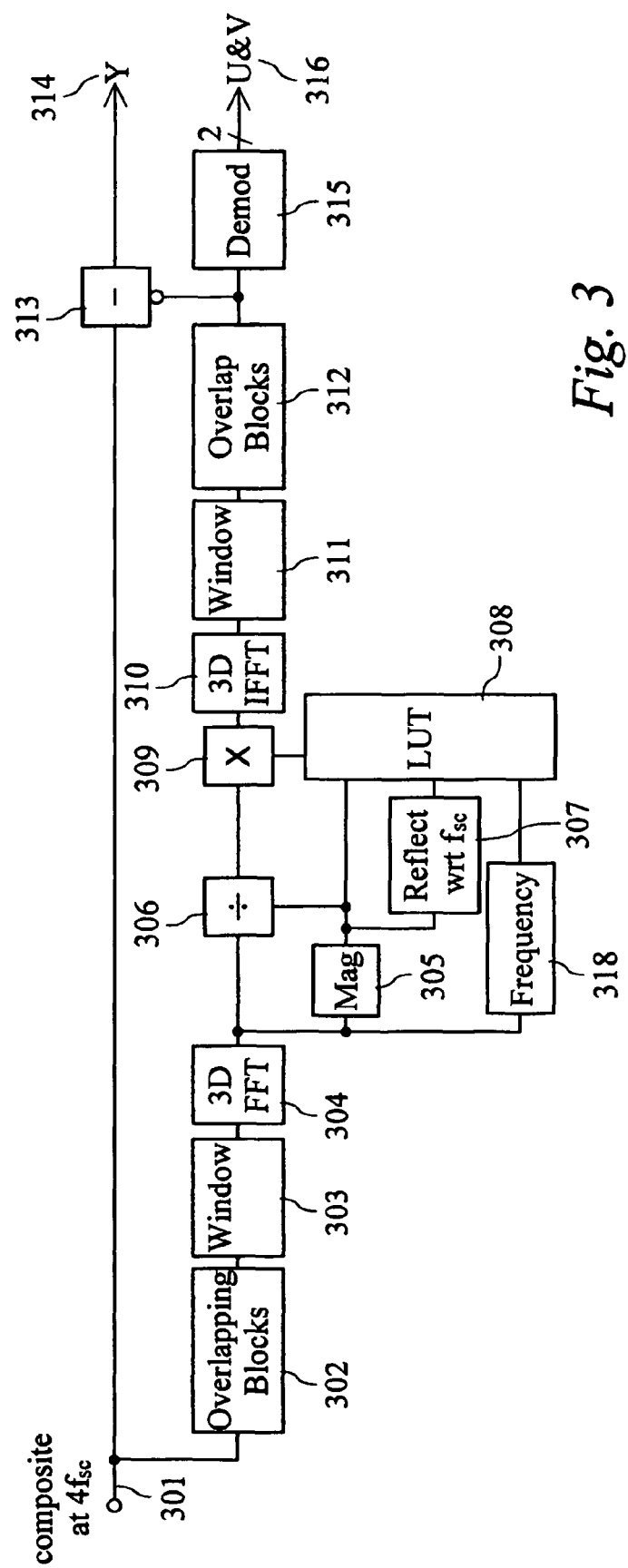
FIG. 3 shows a decoder in accordance with an embodiment of the invention.

It is therefore possible to use the decoder of FIG. 3 to decode NTSC by arranging for frequency components close to the positions (o) and (d) in FIG. 5 to be attenuated. This is done by programming the look-up-table to give negligible output at these frequencies. A suitable method of generating the table contents is to "train" the table by decoding material for which the original un-coded RGB or YUV components are available, and optimising the table to minimise the errors in the decoded output.

The greater likelihood in NTSC of the same sideband frequency resulting from the two baseband chrominance components means that the variation of the look-up-table response with respect to frequency will be greater than in the case of a PAL decoder.

An example of another aspect of the invention, in which the processing is carried out on demodulated chrominance signals, will now be described.

Figure 6:
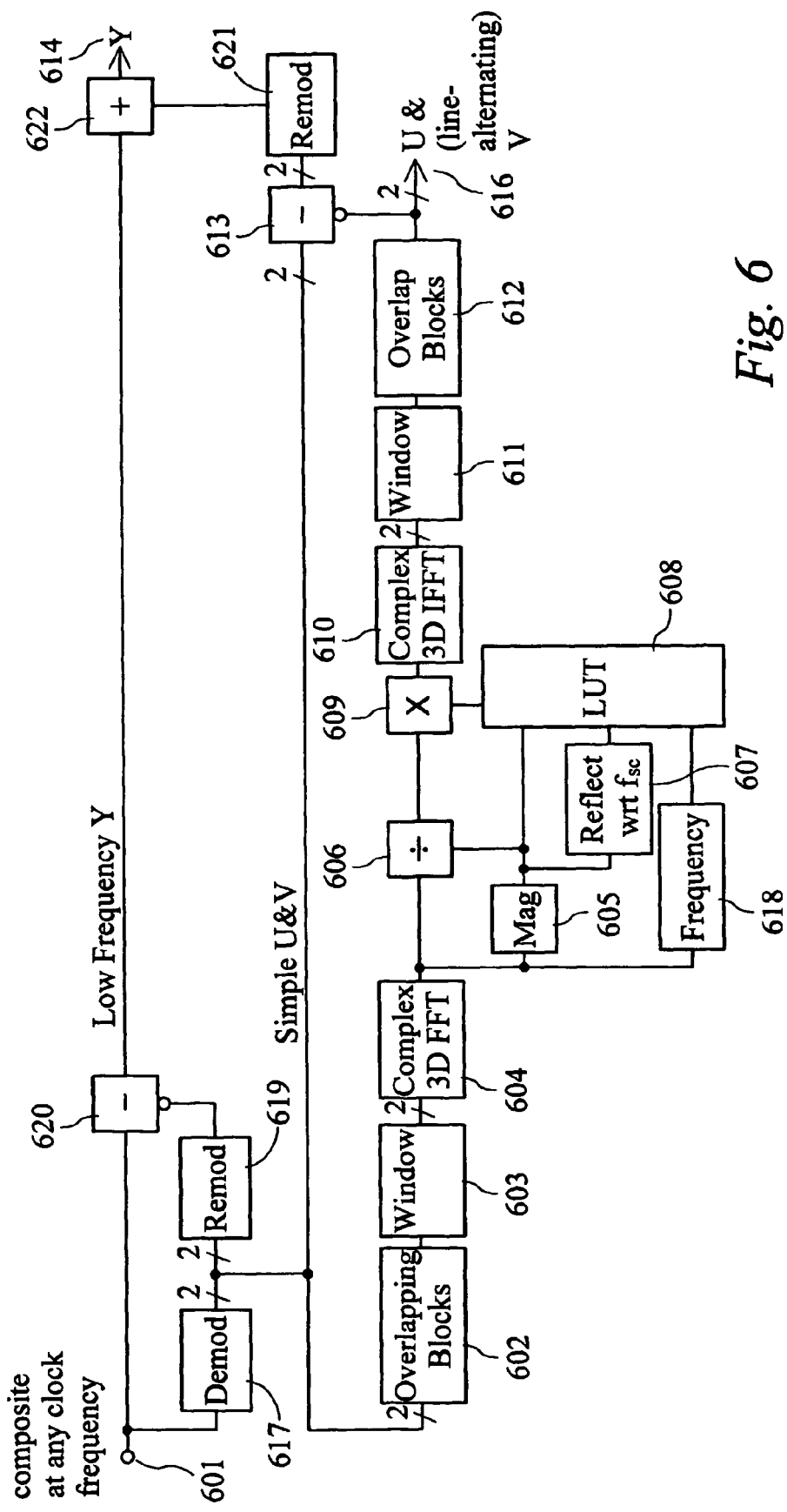
FIG. 6 shows a composite decoder according to another aspect of the invention.

A decoder according to this aspect of the invention is shown in FIG. 6. A composite digital input (601), which may be sampled at any convenient frequency (for example an orthogonal, line-locked sampling frequency) is input to a simple chrominance demodulator (617) which outputs in-phase and quadrature baseband chrominance components. In the case of PAL, the V-axis demodulator should not be reversed on alternate lines. The bandwidth of these demodulated components is made sufficiently wide to ensure that all of the chrominance band is included. These demodulated components will, of course, include cross-colour.

In order to carry out the demodulation it is necessary to represent the colour subcarrier in terms of samples at the video sample rate, and to lock the phase of the demodulating subcarrier to the reference burst of the video input. Known techniques, including "ratio counting", can be used.

The demodulated components are remodulated (619), using the identical carriers that were used for demodulation, and subtracted (620) from the composite input to give a signal which contains only luminance.

The two demodulated components are divided into overlapping blocks (602) and windowed (603) in the same way as in FIGS. 1 and 3. Each block is applied to a complex, three-dimensional FFT (604), which treats the two components as real and imaginary parts of a complex variable. The resulting frequency components are processed in the same way as described above by the blocks (605), (606), (607), (608) and (609) so as to identify symmetrical components and pass them to the inverse FFT (610).

Because the signal has been demodulated, the horizontal frequency which corresponds to colour subcarrier will be zero, and so the determination of horizontal frequency symmetry requires the use of phase information. This is possible because the FFT (604) processes the signal as a complex variable. The vertical and temporal processing can be similar to that described above.

The real and imaginary outputs of the inverse FFT (610) are windowed (611), and the blocks are combined (612) to give two, cross-colour free, colour difference signals (616). In the case of PAL, the V-axis component must be reversed on alternate lines because this was not done at the demodulation stage.

This "clean" chrominance is subtracted (613) (making due allowance for processing delays) from the unprocessed, demodulated chrominance to give baseband cross-colour. This is remodulated (621), onto the same carriers that were used for the demodulation, to give true luminance. This luminance is added (622) (in the correct phase and appropriately timed) to the output of the subtractor (620). The result is a cross-luminance free, full bandwidth luminance output (614).

The decoder structure of FIG. 6 may be used for PAL or NTSC, the only essential differences are the generation of the appropriate subcarrier for demodulation and remodulation, the look-up-table to separate chrominance and luminance, and the alternate line phase reversal of the V-component for PAL.

The decoders described so far have been "complementary", that is to say no input frequencies are lost, they are either processed in the luminance channel or the chrominance channel, and the sum of the chrominance and luminance frequency responses is unity. This ensures theoretical reversibility of the decoding process.

Figure 7:
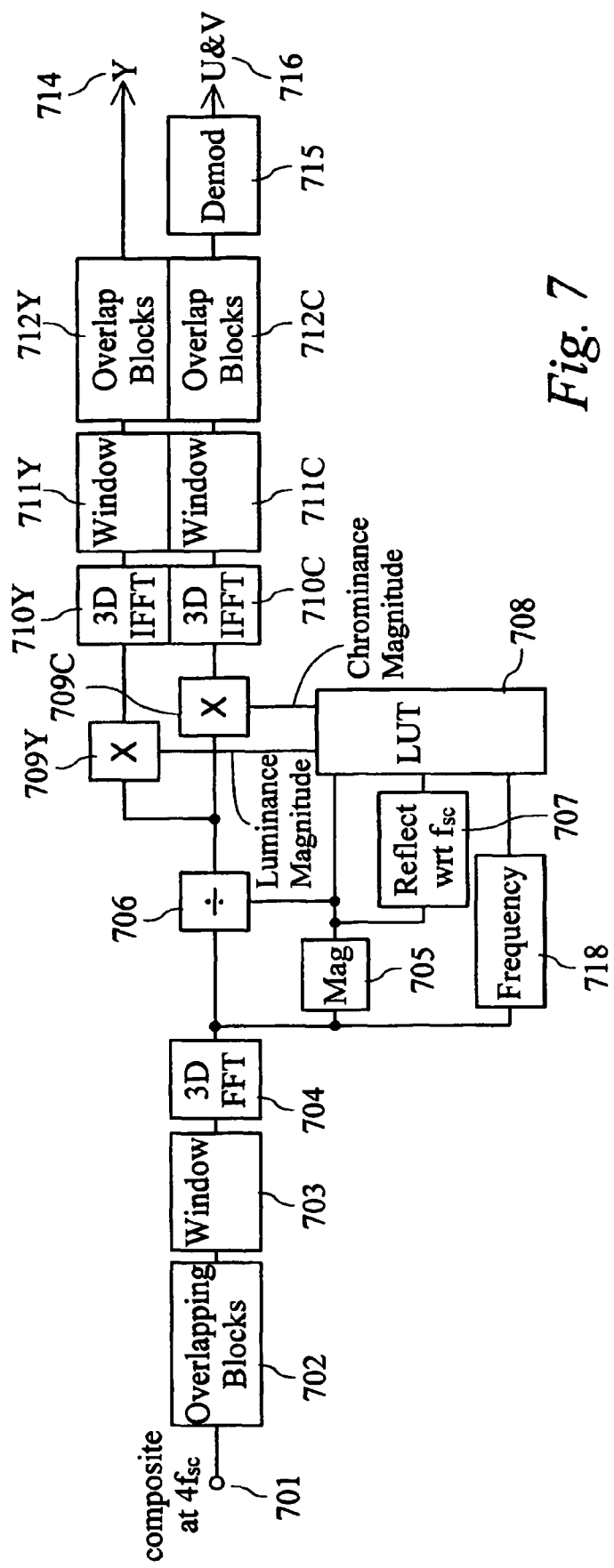
FIG. 7 shows a composite decoder according to yet another aspect of the invention.

If reversibility is not a requirement, it can be advantageous to optimise the chrominance and luminance responses independently of each other. FIG. 7 shows a decoder allowing this possibility.

Referring to FIG. 7, it will be seen that there is some similarity with the decoder of FIG. 3 (the reference numerals of corresponding functional blocks differ only in the first digit). The difference is that the look-up-table (708) has two outputs, one controlling the luminance response, and the other controlling the chrominance response. There are two separate processing chains (709C to 712C, and 709Y to 712Y), which convert the unit-amplitude frequency components from the divider 706 to luminance and chrominance signals.

The look-up-table 708 can be considered as two separate tables with common inputs, one table producing a luminance amplitude control signal for the multiplier (709Y), and the other producing a chrominance amplitude control signal for the multiplier (709C). The multipliers control the magnitudes of the frequency components input to respective inverse FFT stages (710Y) and (710C).

Figure 8:
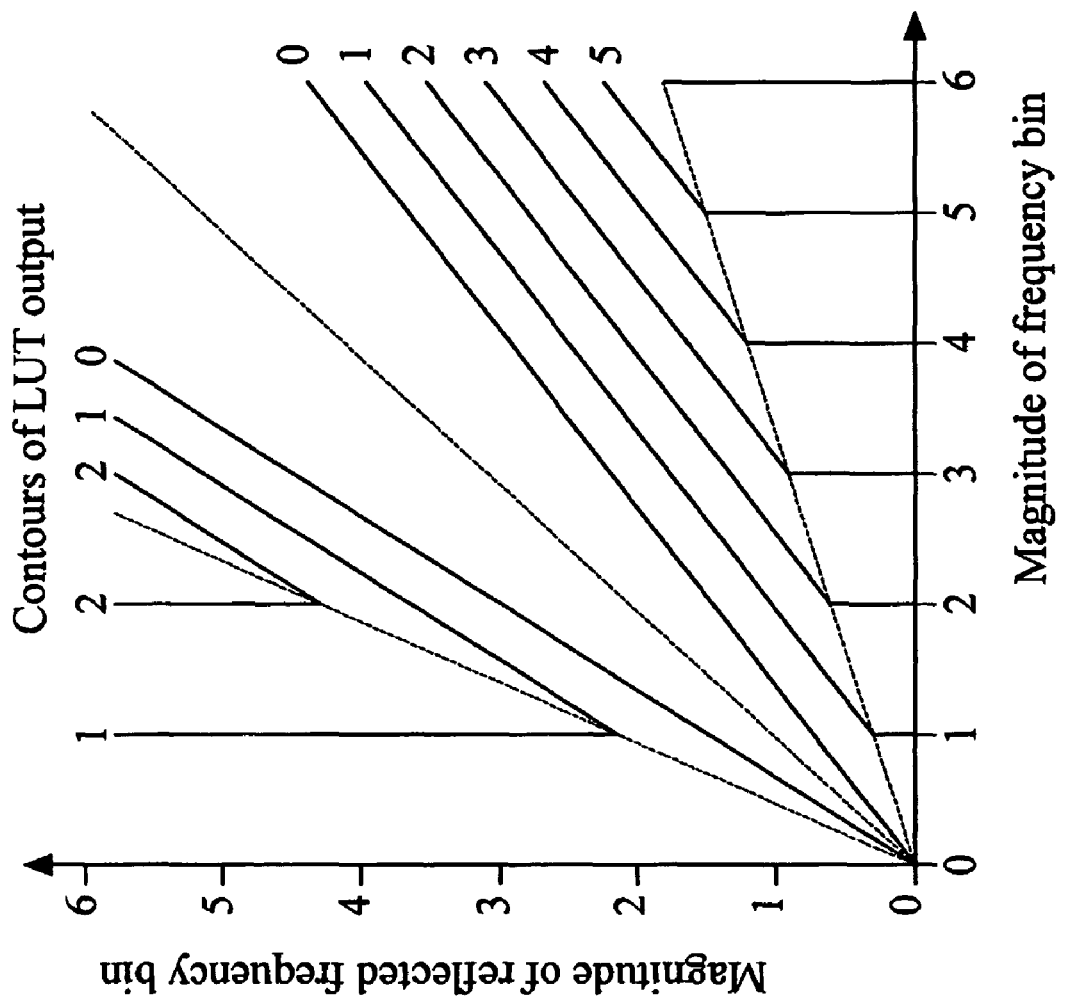
FIG. 8 shows a luminance processing look-up-table.

FIG. 8 shows an example of how the luminance amplitude control signal depends on the table inputs for a table "page" close to subcarrier frequency. Where the frequency component being processed is similar in amplitude to the corresponding "reflected" component, the output from the table is zero. Where the two frequency components have significantly different amplitudes, the table output corresponds to the amplitude of the frequency component being processed. Between these conditions the table output varies smoothly between these two states. This response is the "complement" of the response shown in FIG. 4.

Figure 9:
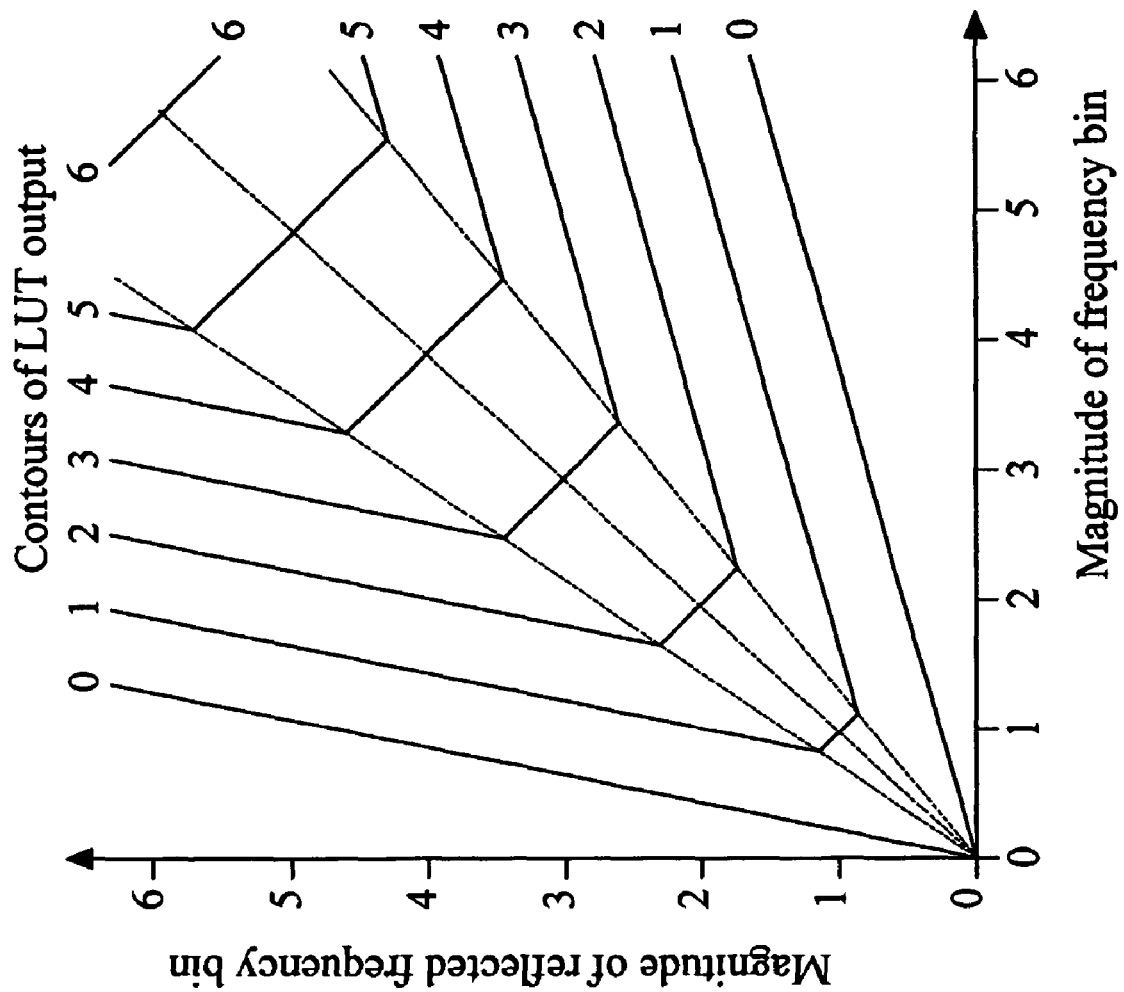
FIG. 9 shows a chrominance processing look-up-table.

FIG. 9 shows the chrominance amplitude control signal for a similar region of the table. As the chrominance table is not constrained by the needs of the luminance channel a response which corrects for distortion of the chrominance can be implemented. Where the frequency component and its reflection are nearly equal in magnitude, the output is equal to the average of the two amplitudes, otherwise the response is similar to that shown in FIG. 4. This averaging can eliminate the U/V crosstalk which results from unwanted attenuation of the upper chrominance sidebands by filters in the transmission chain prior to the decoder.

Figure 10:
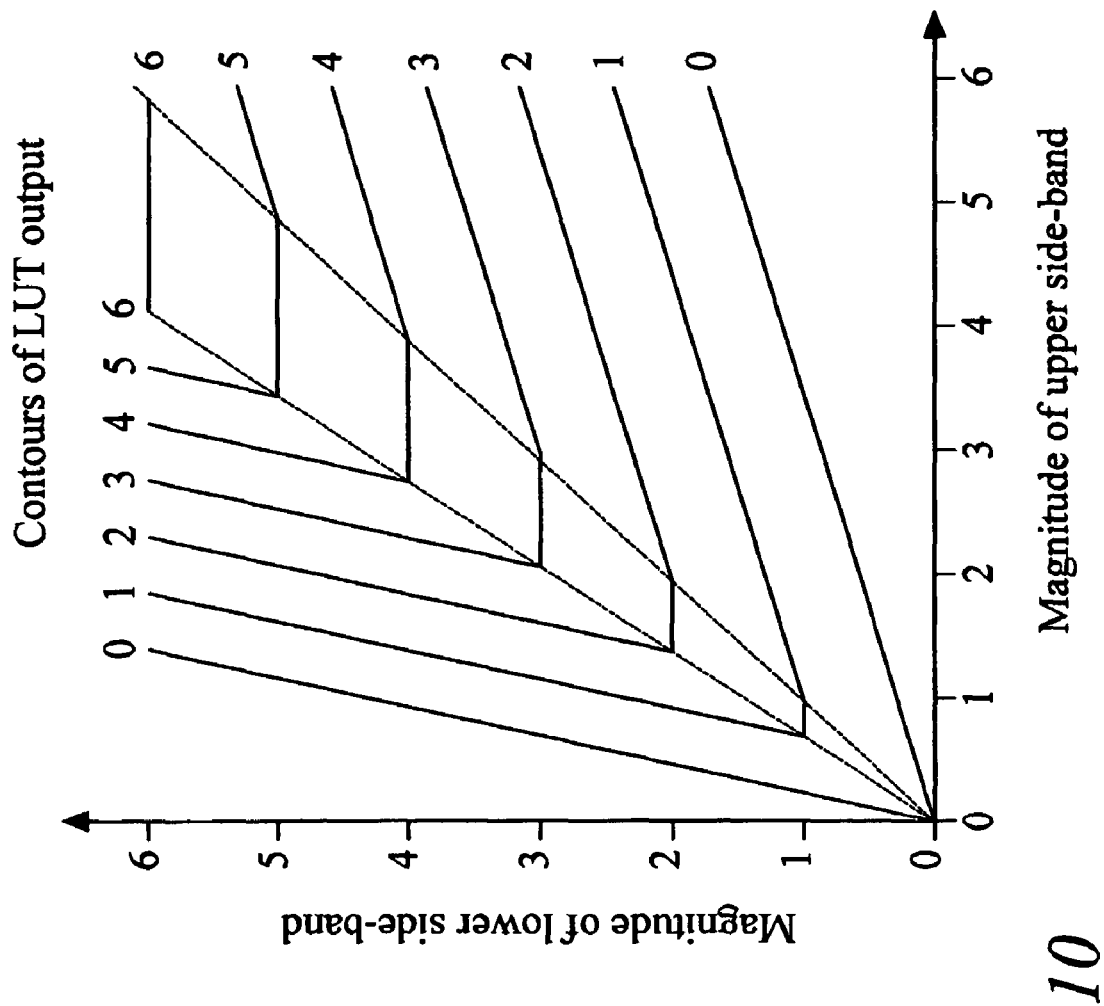
FIG. 10 shows a look-up-table for correcting high-frequency loss.

Although the U/V crosstalk is eliminated the chrominance resolution is degraded. FIG. 10 shows another chrominance look-up-table function, which restores the lost chrominance resolution. Here the frequency input to the table is used to determine whether the frequency component being processed is an upper or lower chrominance sideband (i.e. whether the signal frequency corresponding to the spatial frequency is higher or lower than that of the unmodulated subcarrier frequency). When the frequency being processed corresponds to an upper sideband, and its amplitude is slightly less than that of the corresponding lower sideband, the table output corresponds to the amplitude of the respective lower sideband. When the frequency input to the table shows that a lower chrominance sideband may be being processed, a response as shown in FIG. 4 is used. In this way the high frequency chrominance loss is corrected as well as the U/V crosstalk.

A suitable method of generating the table is to "train" it as described above, using composite material which has suffered a range of sideband losses.

Figure 11:
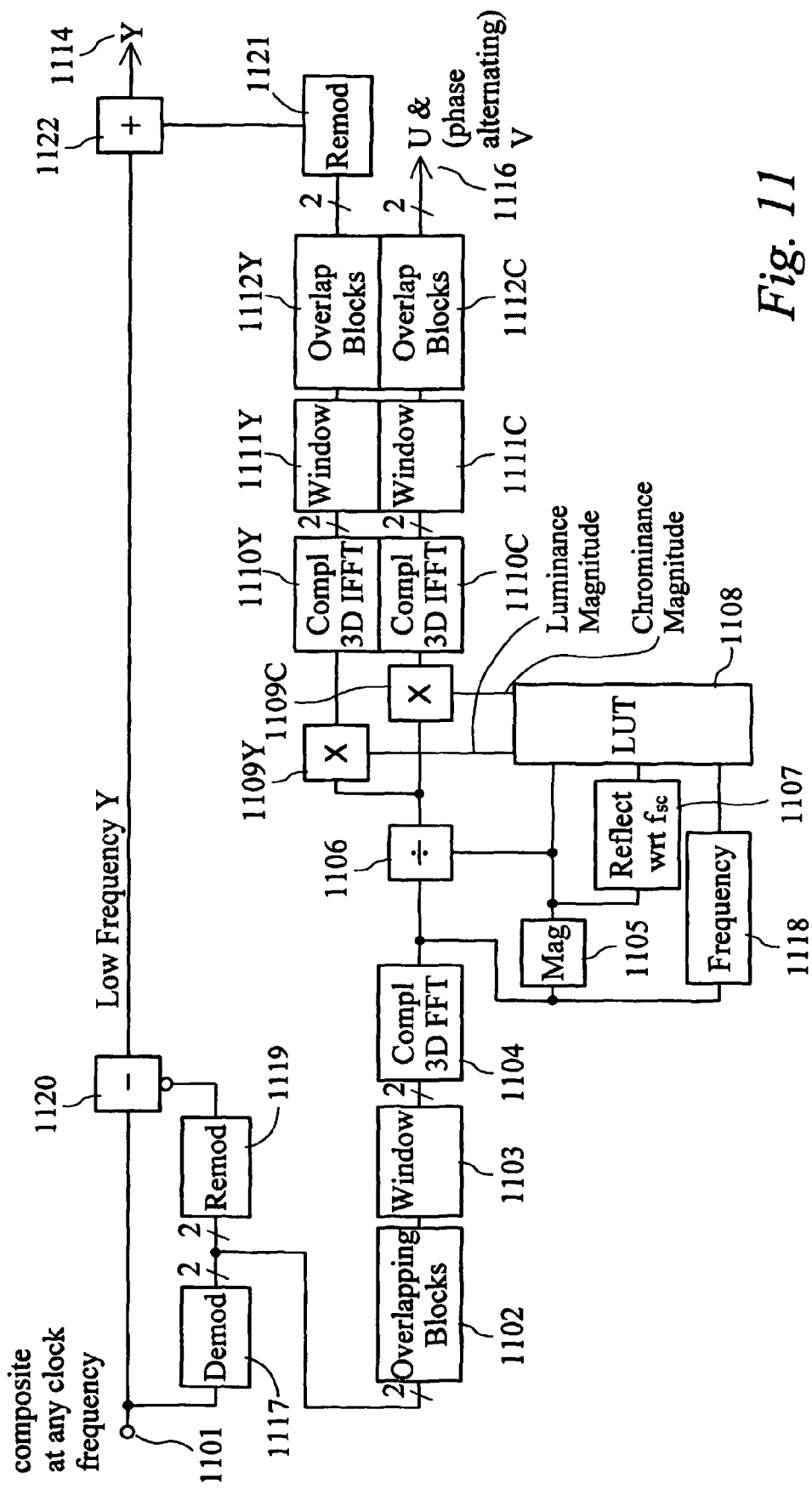
FIG. 11 shows a composite decoder according to another embodiment of the invention.

The chrominance processing methods of FIGS. 9 and 10 are not appropriate for the decoders of FIG. 3 or 6 because the modified chrominance would not cancel the input chrominance and cross-luminance would result. However, the decoder of FIG. 6 can be modified to include a separate luminance path as shown in FIG. 11. Those elements of FIG. 11 which correspond to FIG. 6 have been given similar reference numerals; the (6*) being replaced by (11*). The look-up-table (1108) has separate outputs to control the chrominance and luminance responses in the same way as the decoder of FIG. 7.

It has been explained that different frequencies can address different pages of the look-up-table. Other parameters can be used instead of, or as well as, frequency. Vertical, horizontal or temporal signal-differences can be used to determine the page to be used. The transform may use less than three frequency dimensions, for example the temporal dimension may be omitted and reliance placed upon signal-differences to identify movement in the image being decoded.

A further improvement is possible by analysing the low-frequency portion of the composite signal spectrum, which cannot contain high-amplitude chrominance, and noting whether there are spatial frequency components present which correspond with the spatial frequency of the demodulated chrominance. If corresponding components are found, it is more likely that the demodulated chrominance is true chrominance. If there is a lack of correlation the demodulated signal is more likely to be cross-colour. The allocation of a particular frequency component to chrominance can be biased accordingly.

Figure 12:
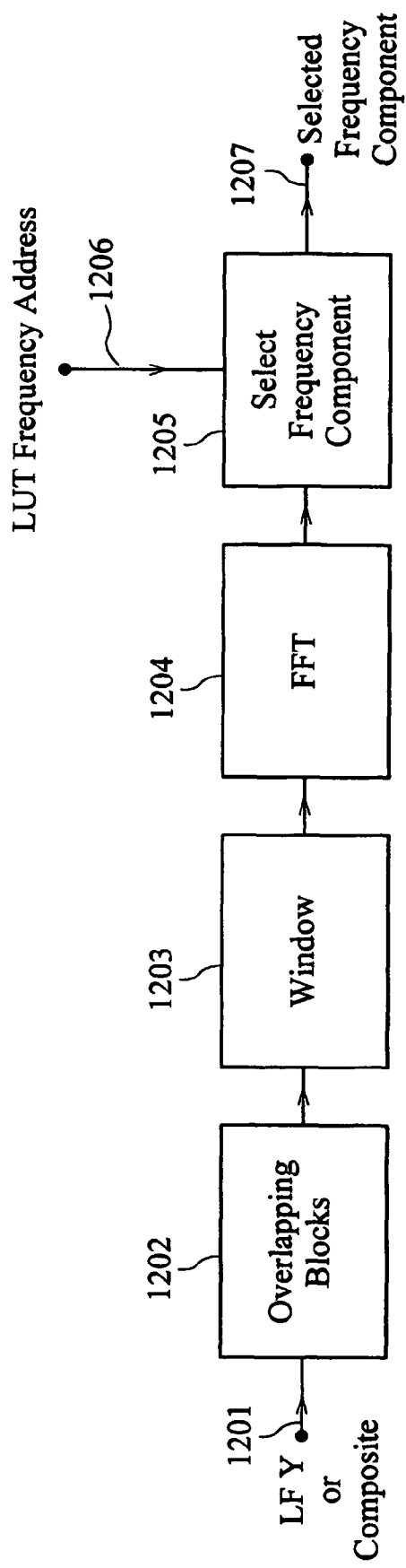
FIG. 12 shows a modification of the invention.

FIG. 12 shows an example of how such processing could be carried out. This figure shows additional processing which could be combined with that shown in FIG. 6 so as to obtain improved performance. Referring to FIG. 12, a low-frequency input (1201) is separated into overlapping blocks (1202), windowed (1203) and input to an FFT processor (1204).

The input (1201) can be the decoder input after suitable low pass filtering, or more conveniently, the output of the subtractor (620) in FIG. 6. The intention is to process only those parts of the spectrum which are so far from subcarrier frequency that they contain no high-amplitude chrominance components.

The block structure should be the same as, and the processing should be concurrent with, that used in the luminance/chrominance separation process as the result will be used to provide additional information to the look-up-table (608).

The output of the FFT process (1204) is a set of frequency coefficients describing the spectrum of the current block of pixels. A coefficient selector (1205) selects one of these coefficients in dependence upon a control address (1206). This control address is the frequency value output from the block (618) in FIG. 6. The output (1207) is used to modify the action of the look-up-table (608).

The frequency required to be selected by the block (1205) is actually the same as that of the component being processed in the look-up-table (608) because the table is processing baseband chrominance. The output of the selector (1205) is thus a measure of whether there is luminance having the same spatial frequency as the chrominance which is currently being analysed in the look-up-table. The magnitude of the output (1207) from the block (1205) can thus be used in the look-up-table to bias its decision towards true chrominance. This may be achieved by comparing the magnitude of the output of block (1205) with a suitable threshold value, which may be a 'soft' threshold.

A more precise method is to compare the magnitude of the low-frequency luminance coefficient at the output of the selector (1205) with the magnitude of the coefficient being processed by the look-up-table. When the luminance coefficient magnitude (at the output of (1205)) is not significantly smaller than the magnitude of the coefficient (to be identified as luminance or chrominance) output from the block (605), the table (608) is biased towards allocating the relevant frequency to chrominance by increasing the gain of the multiplier (609).

The decoder of FIG. 3 can also be modified to make use of low frequency luminance information. This is shown if FIG. 13, which shows a modification to the blocks (305), (307), (308), and (318) of FIG. 3.

Figure 13:
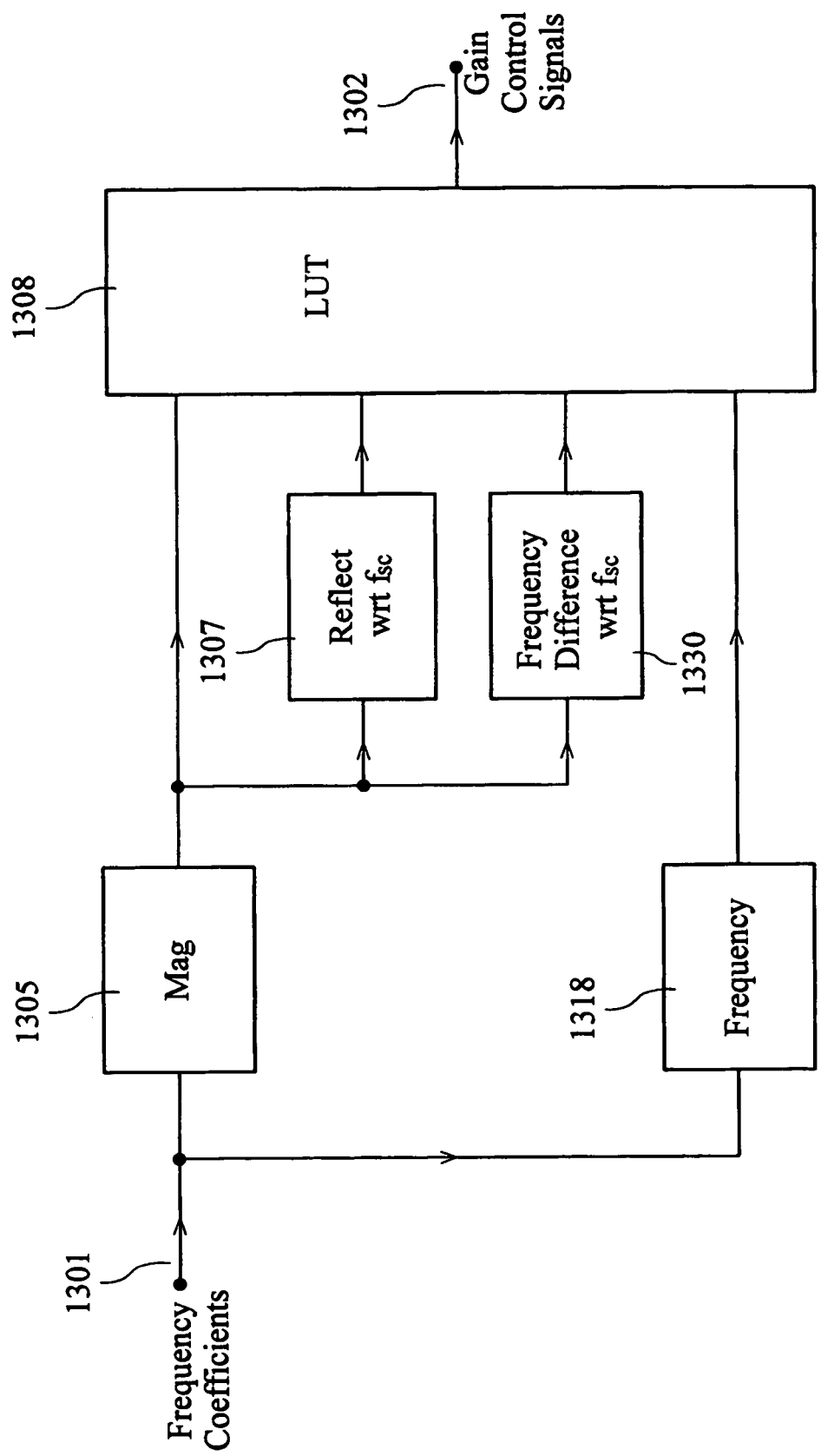
FIG. 13 shows an alternative modification.

Referring to FIG. 13, a set of frequency coefficients (1301) which have been derived from the signal to be decoded are processed to determine a corresponding set of gain control signals (1302) which determine how much of each respective coefficient is allocated the chrominance channel and to the luminance channel of the decoder.

The decision is made by the look-up-table (1308) on the basis of: the magnitude of the coefficient being processed, from the block (1305); the magnitude of the coefficient at the corresponding frequency reflected about subcarrier frequency, from the block (1307); the frequency of the coefficient being processed, from the block (1318); and, the magnitude of the coefficient at the frequency which corresponds to the coefficient being processed having been demodulated (with subcarrier), from the block (1330).

The block (1330) determines the (three dimensional) frequency difference between the frequency of the coefficient being processed and the subcarrier frequency; and then passes the magnitude of the coefficient at this difference frequency to the look-up-table (1308).

For example, suppose the coefficient due to a (horizontal/vertical/temporal) frequency of 190 c/apw, 125 c/aph and −16 Hz is being processed in an NTSC decoder. Subcarrier frequency corresponds to 188 c/apw, 120 c/aph and −15 Hz and so the difference frequency is 2 c/apw, 5 c/aph and −1 Hz; and this is the frequency whose coefficient is used to assist the decoding of the coefficient being processed.

The table (1308) is arranged to increase its output when the output from the block (1330) is not significantly smaller than the signal from the block (1305). In this situation the coefficient being processed is more likely to be true chrominance. Alternatively the table is arranged to favour chrominance when the absolute value of the output of the block (1330) exceeds a suitable threshold.

It must be recognised that examples of the invention have been described here and that the skilled person will be able to implement it in other ways which fall within the concept which has been described.

The invention claimed is:

1. A method of separating the chrominance and luminance of a composite color television signal comprising:
receiving in a processor a set of first frequency components of the signal, receiving a set of second frequency components of the signal, each second component having a frequency difference from the color subcarrier equal and opposite to the frequency difference from the color subcarrier of the associated first frequency component,
comparing in a processor each of said first frequency components with the respective second frequency component in a comparison process having inputs for the magnitude of the frequency component being processed, the magnitude of the corresponding component symmetrically disposed with respect to subcarrier and the frequency of the frequency component being processed, and
determining in a processor on the basis of said comparison process whether a particular component represents chrominance or luminance;
wherein the nature of the comparison depends upon the frequency of the frequency component being processed.

2. A method according to claim 1, in which the nature of the comparison depends upon the horizontal spatial frequency of the frequency component being processed.

3. A method according to claim 1, in which the nature of the comparison depends upon the vertical spatial frequency of the first frequency component being processed.

4. A method according to claim 1, in which the nature of the comparison depends upon the temporal frequency of the first frequency component being processed.

5. A method according to claim 1, in which the nature of the comparison depends upon horizontal, vertical or temporal differences of the composite television signal.

6. A method according to claim 1, in which the comparisons differ in dependence upon horizontal, vertical or temporal differences derived from the chrominance demodulated output of the composite television signal.

7. A method according to claim 1, wherein the comparison varies in dependence upon the magnitude of a third frequency component of the signal, said third component having a frequency which corresponds to the equivalent baseband chrominance frequency of the first frequency component.

8. A method according to claim 7, wherein said third component has a frequency equal to the frequency difference between the frequency of the first frequency component and the color subcarrier frequency.

9. A method according to claim 7, wherein said third frequency component contains no chrominance information.

10. A method according to claim 7, in which the separation favours chrominance when the third frequency component has a magnitude which is greater than a threshold value.

11. A method according to claim 7, in which the separation favours chrominance when the third frequency component has an amplitude which is not substantially less than the amplitude of said first signal component.

12. A method of processing a television signal according to claim 1 wherein the signal is sampled at an integer multiple of the line frequency.

* * * * *